US006984073B2

(12) United States Patent
Cox (10) Patent No.: US 6,984,073 B2
(45) Date of Patent: Jan. 10, 2006

(54) OPTICAL AND OPTO-ELECTRONIC INTERCONNECT ALIGNMENT SYSTEM

(75) Inventor: Larry R. Cox, Austin, TX (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/685,149

(22) Filed: Oct. 14, 2003

(65) Prior Publication Data

US 2005/0078914 A1    Apr. 14, 2005

(51) Int. Cl.
    *G02B 6/38* (2006.01)
(52) U.S. Cl. .......................................... 385/55; 385/90
(58) Field of Classification Search ................ 385/53, 385/54, 55, 88, 89, 90, 92
    See application file for complete search history.

(56) References Cited

U.S. PATENT DOCUMENTS

| 4,890,895 | A | | 1/1990 | Zavracky et al. .......... 350/96.2 |
| 4,899,254 | A | | 2/1990 | Ferchau et al. ............. 361/384 |
| 4,944,568 | A | * | 7/1990 | Danbach et al. ............. 385/88 |
| 5,080,461 | A | | 1/1992 | Pimpinella ................... 385/65 |
| 5,138,679 | A | * | 8/1992 | Edwards et al. .............. 385/90 |
| 5,245,683 | A | | 9/1993 | Belenkiy et al. .............. 385/72 |
| 5,542,015 | A | | 7/1996 | Hultermans .................. 386/60 |
| 5,692,089 | A | | 11/1997 | Sellers ....................... 385/137 |
| 5,796,896 | A | | 8/1998 | Lee ............................. 385/59 |
| 5,828,807 | A | | 10/1998 | Tucker et al. ............... 385/135 |
| 6,196,856 | B1 | | 3/2001 | De Villeroche |
| 6,318,902 | B1 | | 11/2001 | Igl et al. ...................... 385/59 |
| 6,331,079 | B1 | * | 12/2001 | Grois et al. .................. 385/53 |
| 6,334,784 | B1 | | 1/2002 | Howard ....................... 439/260 |
| 6,343,171 | B1 | | 1/2002 | Yoshimura et al. ........... 385/50 |
| 6,358,075 | B1 | | 3/2002 | Tischner ..................... 439/248 |
| 6,390,690 | B1 | | 5/2002 | Meis et al. .................... 385/88 |
| 6,419,399 | B1 | * | 7/2002 | Loder et al. .................. 385/53 |
| 6,485,192 | B1 | | 11/2002 | Plotts et al. .................. 385/75 |
| 6,535,397 | B2 | | 3/2003 | Clark et al. .................. 361/788 |
| 6,540,414 | B1 | | 4/2003 | Brezina et al. ............... 385/92 |
| 6,582,133 | B2 | | 6/2003 | Harris et al. ................. 385/53 |
| 6,588,943 | B1 | | 7/2003 | Howard ....................... 385/88 |
| 2002/0094705 | A1 | | 7/2002 | Driscoll et al. ............... 439/65 |
| 2002/0126960 | A1 | | 9/2002 | Gurreri ........................ 385/76 |
| 2002/0180554 | A1 | | 12/2002 | Clark et al. .................. 333/33 |
| 2002/0181883 | A1 | | 12/2002 | Harris et al. ................. 385/53 |
| 2003/0068140 | A1 | | 4/2003 | Brezina et al. ............... 385/92 |

FOREIGN PATENT DOCUMENTS

| WO | WO 02/16989 A1 | 2/2002 |
| WO | WO 02/101436 A1 | 12/2002 |
| WO | WO 03/081311 A1 | 10/2003 |

OTHER PUBLICATIONS

Shin'Ichi Iwano, et al., "Compact and Self-Retentive Multi-Ferrule Optical Backpanel Connector", Journal of Lightwave Technology Oct. 10, 1992, No. 10, New York.
International Search Report for PCT/US2004/028867.

* cited by examiner

Primary Examiner—Thanh-Tam Le
(74) Attorney, Agent, or Firm—Melanie G. Gover (57) ABSTRACT

A connector alignment system includes a base for mounting on a first substrate, and a housing movably engaged with the base. The housing secures an opto-electronic termination. The housing has longitudinal, lateral, transverse and angular ranges of motion with respect to the base. When the housing is in an unmated position, various combinations of the lateral, transverse and angular ranges of motion are less than the respective ranges of motion when the housing is in a mated position.

32 Claims, 7 Drawing Sheets

OPTICAL AND OPTO-ELECTRONIC INTERCONNECT ALIGNMENT SYSTEM

BACKGROUND OF THE INVENTION

The present invention relates to an interconnect alignment system for use with optical and opto-electronic systems. More particularly, the present invention relates to a device for providing alignment control during mating of an optical or opto-electronic connector system.

Cabinets traditionally used for electronic devices are now being utilized to accommodate optical and opto-electronic devices. In traditional cabinet designs, the cabinet comprises a box having a plurality of internal slots (also known as racks), generally parallel to each other. Components are mounted on planar substrates (commonly referred to as circuit boards or daughter cards, or simply boards or cards) which are designed to slide into the slots within the cabinet. As a card is inserted into the slots within the cabinet, mechanical, electrical and/or optical connections are formed with mating components in the cabinet.

Mating components in the cabinet are typically on a backplane in the cabinet. A backplane derives its name from the back (distal) plane in a parallelepipedal cabinet and generally is orthogonal to the plane of the inserted card. The term backplane as used in connection with the present invention refers to an interconnection plane where a multiplicity of interconnections may be made, such as with a common bus or other external device. For explanation purposes, a backplane is described as having a front or interior face and a back or exterior face.

An example of a backplane connectivity application is the interconnection of telephone switching equipment. In this application, cards having optical and electronic telecommunication components are slid into cabinets. As a function of inserting and removing a card from a rack coupled to the backplane, coupling and uncoupling of the electrical and optical connections in the card must be completed in a blind mating manner.

To maintain appropriate transmission of light signals in an optical connection, optical fiber ends should be carefully aligned along all three linear movement axes (x, y, and z), as well as aligned angularly. Alignment challenges increase and dimensional tolerances decrease as the number of optical fibers to be aligned increases. Blind mating of a card-mounted component to a backplane connector has been found to create special challenges with regards to alignment and mating force issues along the axis of interconnection.

For the purposes of the present description, the axis of interconnection is called the longitudinal or x-axis and is defined by the longitudinal alignment of the optical fibers at the point of connection. Generally, in backplane applications, the longitudinal axis is collinear with the axis of movement of the cards and the axis of connection of the optical fibers in and out of the cabinets. The lateral or y-axis is defined by the perpendicular to the x-axis and the planar surface of the card. Finally, the transverse or z-axis is defined by the orthogonal to the x-axis and the backplane surface. The angular alignment is defined as the angular orientation of the card with respect to the x-axis.

Ideally, the motion of sliding the card into a receiving slot simultaneously achieves optical and/or electrical interconnection between the card components and the backplane. However, dimensional tolerances of the cards, the components thereon and the slots themselves may result in excessive movement or "play" of a card in a slot. Thus, when an operator inserts a card in a slot, it is often difficult to maintain the leading card edge and components thereon in correct alignment with the axes of the backplane.

Figure 1A:
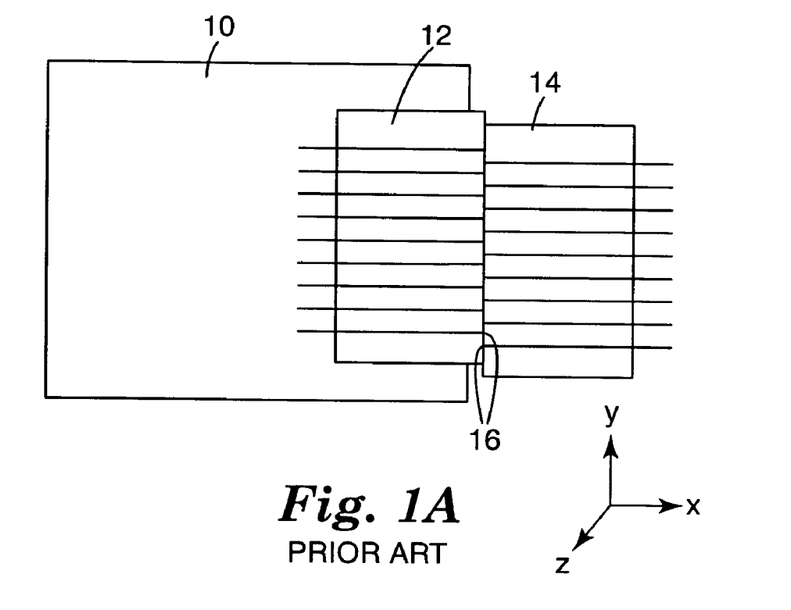
FIG. 1A is a side elevation view of a linearly misaligned card and a backplane connector.

To achieve a good interconnection, the card components should be properly aligned along the longitudinal, lateral and transverse axes with the mating components on the backplane as the card is inserted in the slot. Longitudinal misalignment influences the "optical gap" (the distance along the longitudinal axis between the optical fiber ends of interconnected optical components). An optical gap will degrade the connection, resulting in the loss or degradation of the optical signals and creates undesirable internal reflecting. On the other hand, excessive pressure on the mating faces, such as that caused by "jamming in" a card, may result in damage to the fragile optical fiber ends and mating components. Traditional optical gap tolerances are in the order of less than one micron. Lateral and transverse misalignment influence the ability to make an interconnection at all. If the card is sufficiently misaligned along the lateral or transverse axis, stubbing of the mating connector halves may occur and interconnection may be prevented completely. FIG. 1A illustrates a linearly misaligned card 10 having a connector 12 mating to a backplane connector 14. In FIG. 1A, the card 10 is grossly misaligned along the lateral (y) axis such that optical fibers 16 are not properly aligned and interconnection is prevented.

Figure 1B:
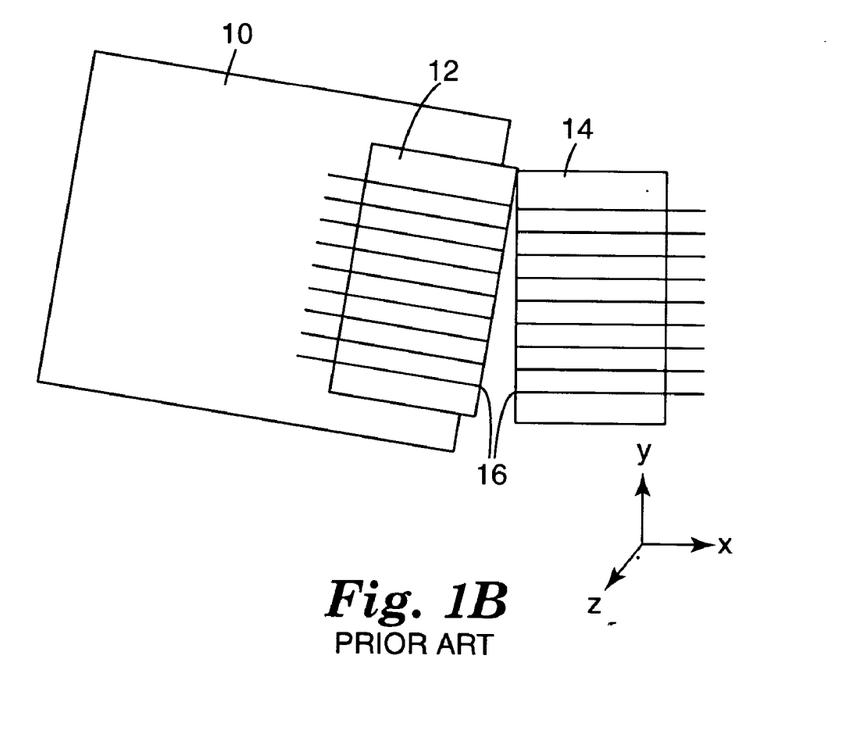
FIG. 1B is a side elevation view of an angularly misaligned card and a backplane connector.

Another consideration is angular misalignment of the card. FIG. 1B illustrates angularly misaligned card 10. The card is otherwise correctly aligned along the y and z-axes. At the point of contact between connectors 12 and 14, the angular misalignment prevents correct optical gap spacing between optical fibers 16 and causes undue pressure on one end of the connector and the respective optical fiber end faces.

An additional subject of concern is "card gap", especially when dealing with backplane connector systems. Card gap is defined as the space remaining between the rear edge of a card and the interior or front face of the backplane. In general, designers and users of backplane connection systems find it exceedingly difficult to control the position of a card to a backplane within the precision range required for optical interconnects. Card gap, otherwise defined as card insertion distance, is subject to a multiplicity of variables. Among these variables are card length, component position on the surface of the card, card latch tolerances, and component position on the backplane.

Over-insertion of a card relative to the interior surface of a backplane presents a separate set of conditions wherein the backplane connector's components are subjected to excessive compressive stress when fixed in a mated condition. In certain instances the compressive stress may be sufficient to cause physical damage to the connector's components and the optical fibers contained therein.

The need remains for a connector system that prevents component damage due to excessive operator force, compensates for linear card misalignment, yet provides accurate control of optical gap distance and mating force.

SUMMARY OF THE INVENTION

The present invention provides an opto-electronic interconnect alignment system that provides linear and angular alignment control. In one embodiment, the alignment system of the present invention is useful for connecting at least one optical fiber mounted near the edge of a planar substrate (such as a daughter card) to a backplane.

In one embodiment according to the invention, the connector alignment system comprises a base configured for mounting on a first substrate, and a housing movably engaged with the base. The housing is configured to secure an optical or opto-electronic termination, such as a terminating ferrule for an optical fiber. The housing has a longitudinal range of motion and a lateral range of motion with respect to the base. When the housing is in an unmated position, the lateral range of motion is less than the lateral range of motion when the housing is in a mated position. In another embodiment according to the invention, the housing has a transverse range of motion, and the transverse range of motion is reduced when the housing is in an unmated position. In another embodiment according to the invention, the housing has an angular range of motion, and the angular range of motion is reduced when the housing is in an unmated position. In other embodiments according to the invention, different and various combinations of lateral, transverse and angular ranges of motion are reduced when the housing is in an unmated position.

DETAILED DESCRIPTION

In the following Detailed Description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 2:
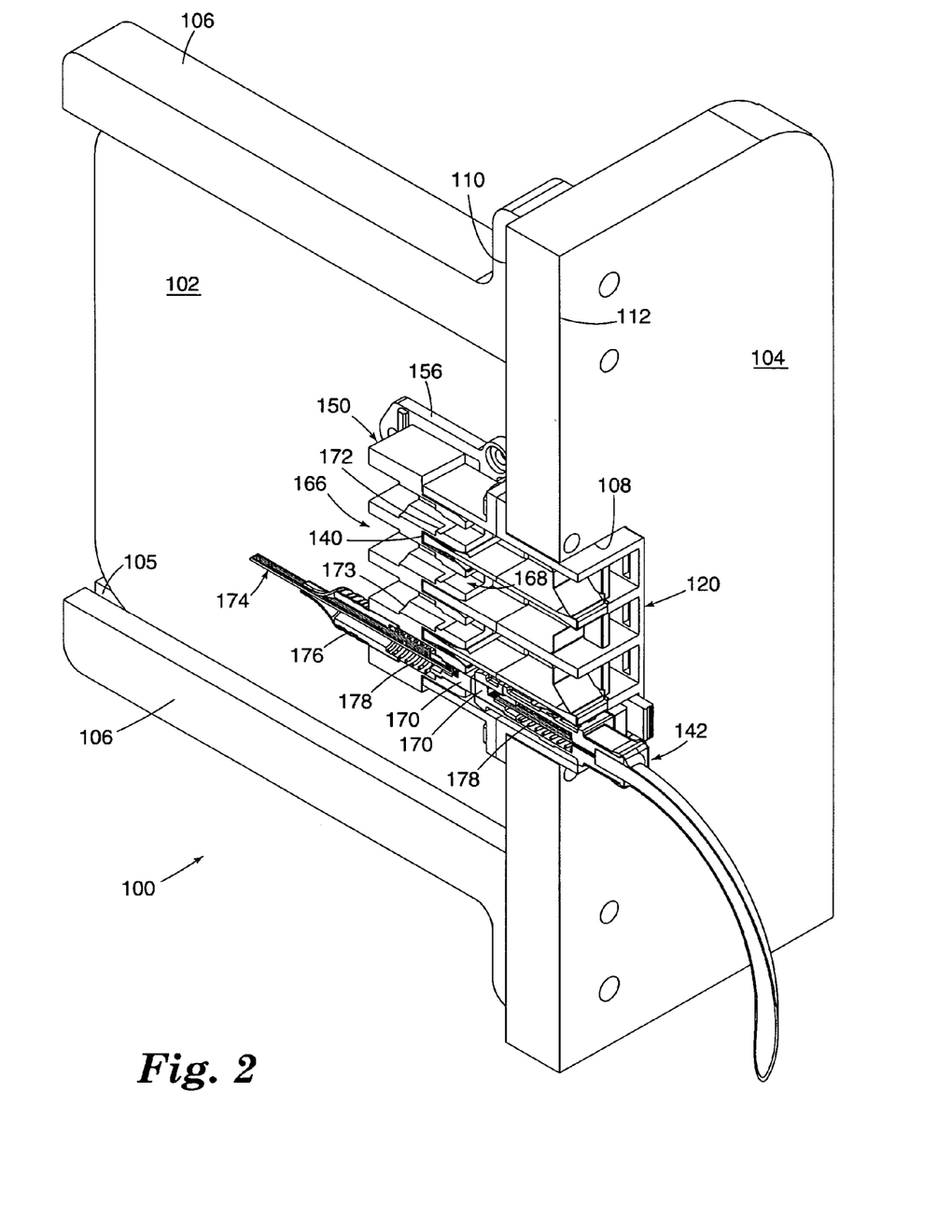
FIG. 2 is an isometric cut-away view of a first embodiment of an interconnect alignment system in accordance with the present invention in a mated card position.
Figure 3:
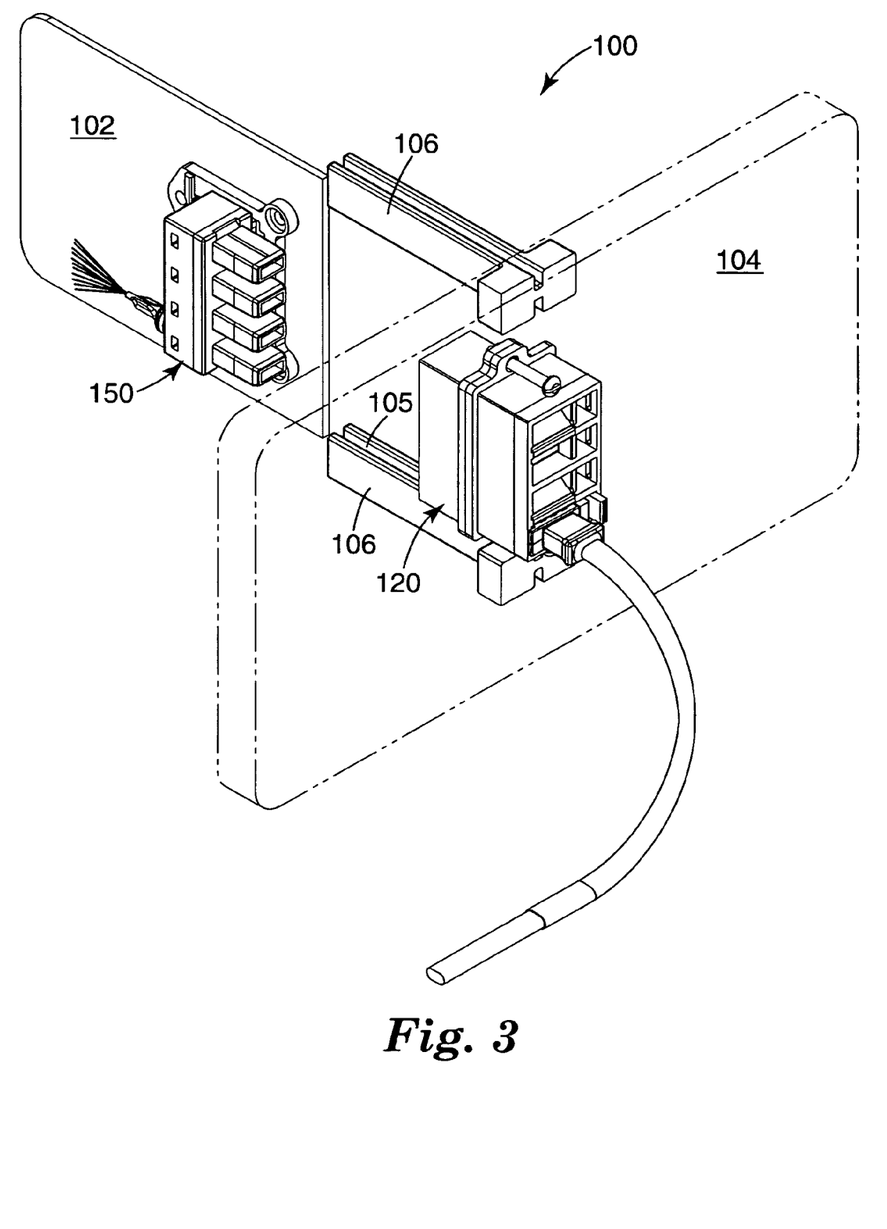
FIG. 3 is an isometric view of the interconnect alignment system illustrated in FIG. 2 in an unmated card position.

FIGS. 2 and 3 illustrate an embodiment of an interconnect alignment system 100 in accordance with the present invention. The interconnect alignment system 100 controls alignment by providing a self-aligning interconnect assembly 150 on a substrate. The self-aligning interconnect assembly is configured for mating with a housing 120 on a second substrate. In one embodiment according to the invention, the first substrate is a planar substrate, such as a daughter board or circuit card 102 which may have optical, optoelectronic, and electronic components thereon. The card 102 may be slideably inserted in a slot 105 defined by card guides 106. In one embodiment according to the invention, the second substrate is a backplane 104 having a through-opening 108 for receiving housing 120, a first interior surface 110 and a second, exterior surface 112.

Although the exemplary interconnect alignment system 100 is described herein as providing alignment control between a circuit card or daughter board and a backplane, such description is for illustrative purposes only. It should be understood that the interconnect alignment system of the present invention is useful in providing alignment control for other types and configurations of mating connectors, and the invention is not to be limited to daughter board and backplane type systems.

As illustrated, housing 120 is disposed within opening 108 of backplane 104. As best seen in the exploded view of FIG. 4, housing 120 defines an array of four receiving cavities 132. Alternative embodiments may include a single receiving cavity or any other necessary number of cavities to accommodate various optical fiber cable connections. Each one of the cavities 132 includes a front opening 134 and a rear opening 136. For the purpose of the description of the present invention the terms rear, front, forward or backward are merely illustrative to help describe the depicted embodiments with respect to the figures. Optional folding front doors 138 are coupled to close the front opening 134 and rear doors 140 are coupled to close rear openings 136. The front and rear doors 138 and 140 in the present embodiment include flat spring metal members hingedly coupled to the front and rear openings 134 and 136. The doors 138 and 140 are designed to fold down flat when a plug is inserted into the opening of the receiving cavity 132. In the present embodiment, the housing 120 comprises molded plastic pieces of a dielectric material that exhibit sufficient structural strength and dimensional stability to maintain control of the optical fiber's position. Such materials include, but are not limited to, thermoplastic injection moldable polymers that are filled or unfilled with reinforcement agents, and transfer moldable polymers such as epoxy. The doors 138 and 140 are made of a conductive metal material, such as tempered stainless steel, beryllium/copper alloys or other materials, and are optionally coupled to provide a grounding electrical path. The housing 120 may include mating features corresponding to common plugs or ferrules.

It should be understood that housing 120 need not be disposed on or through a backplane as illustrated herein. In other embodiments, housing 120 may be disposed on alternate substrates and take other configurations, so long as housing 120 is configured to mate with a card mounted connector assembly 150 as described below.

The front end of the backplane mounted housing 120 mates with card mounted self-aligning connector assembly 150 when the card 102 is advanced in the guide slots 105. The back end of the backplane mounted housing 120 mates with a plug assembly 142. The connector assembly 150 disposed on card 102 includes a housing member 152 movably engaged with a base member 156. Base member 156 is securely mounted on card 102. In the illustrated embodiment, base member 156 is removably secured to card 102 using a combination of positioning pins 157 and screws 158. Those skilled in the art will be readily aware of additional methods for attaching base member 156 to card 102, in either a removable or permanent manner. Alternative embodiments may include attachment means such as mechanical fasteners, spring clips, adhesive or the like, or a combination thereof.

Figure 4:
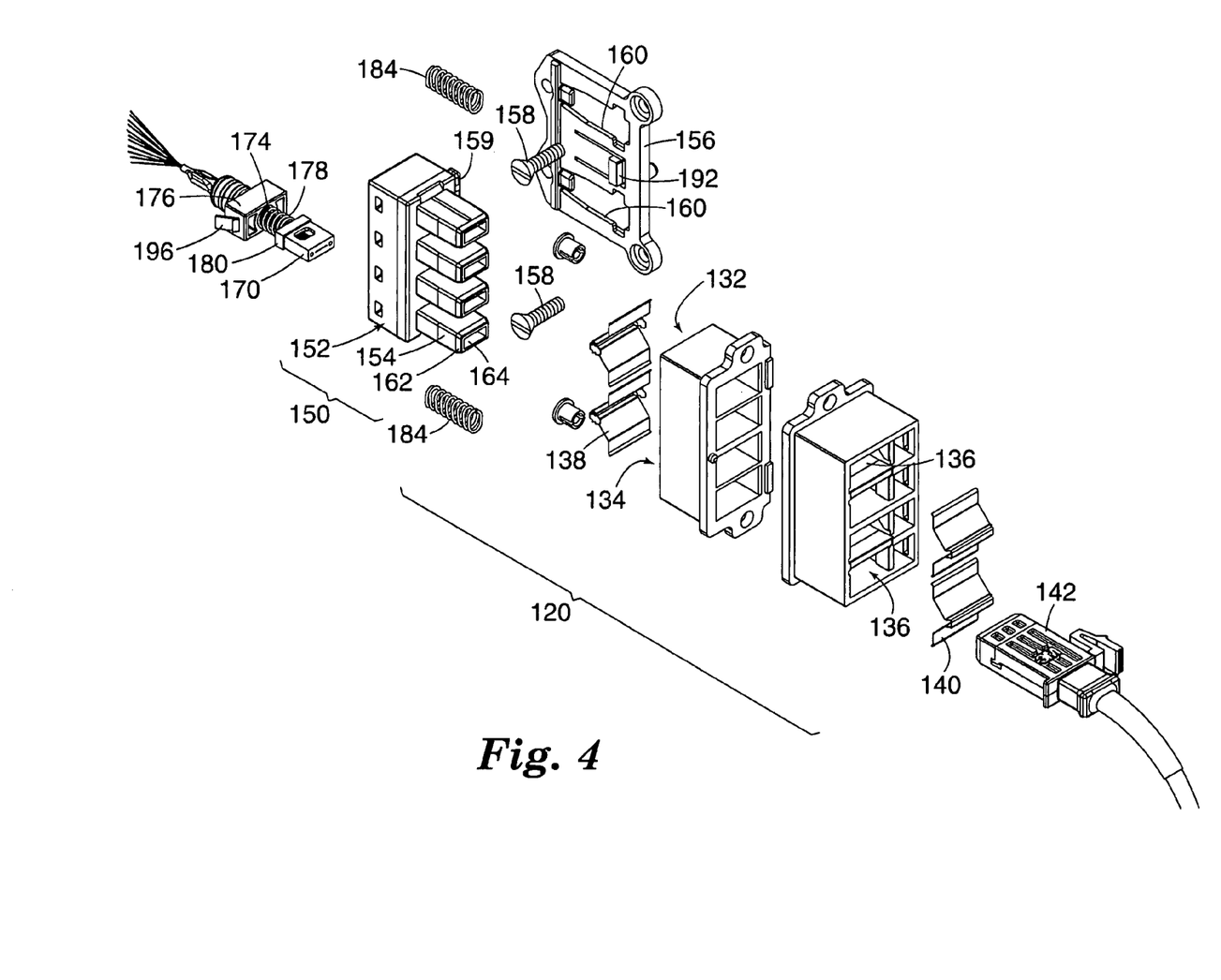
FIG. 4 is an exploded isometric view of the interconnect alignment system illustrated in FIG. 2.

As best seen in FIG. 4, housing member 152 is movably engaged with base member 156 via the engagement of channels 159 on housing member 152 with rails 160 on base member 156. Channels 159 and rails 160 are in generally parallel alignment with the longitudinal axis. Channels 159 and rails 160 are generally loosely fitted to each other and are sized to permit housing member 152 to move or "float" relative to base member 156 within a desired range of motion. The amount of float is preferably sufficient to allow lateral, transverse, and angular movement of housing member 152 when mated with housing 120. In one embodiment according to the invention, in the mated position, the range of motion of housing member 152 relative to base member 156 is in the range of approximately 0.030 to 0.050 inches in the lateral direction, and in the range of approximately 0.005–0.015 inches in the transverse direction. In the unmated position, the range of motion of housing member 152 relative to base member 156 is in the range of less than approximately 0.010 inches in the lateral direction, and in the range of approximately 0.003–0.007 inches in the transverse direction. The illustrated housing member 152 and base member 156 define an array of four channels 159 and rails 160. Alternative embodiments may include a single pair of rails and channels, or any other number of rails and channels necessary to accommodate various sizes of housing members.

Figure 5A:
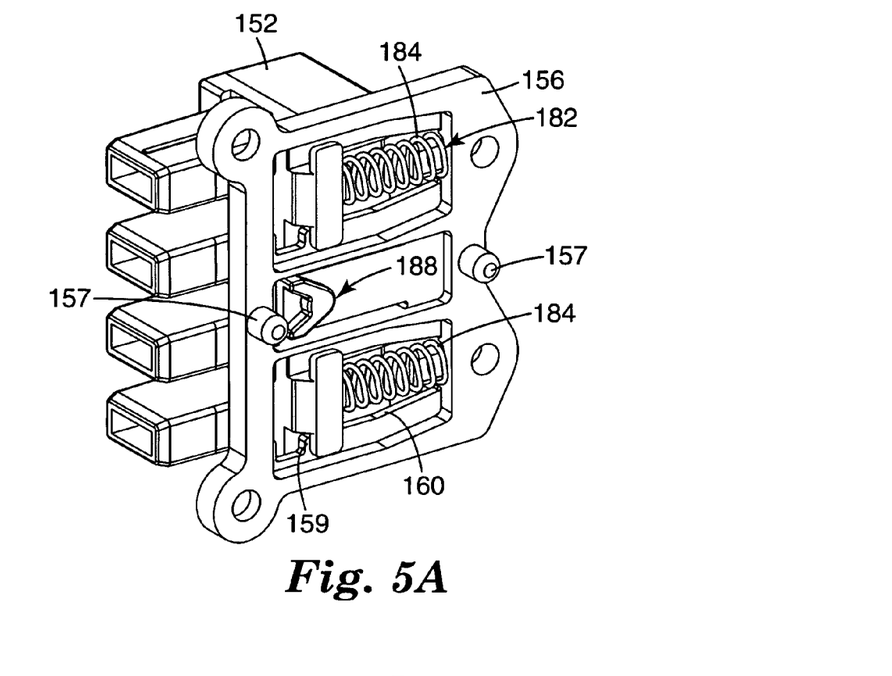
FIG. 5 is an isometric view of the housing member and base of the interconnect alignment system illustrated in FIG. 2.
Figure 5B:
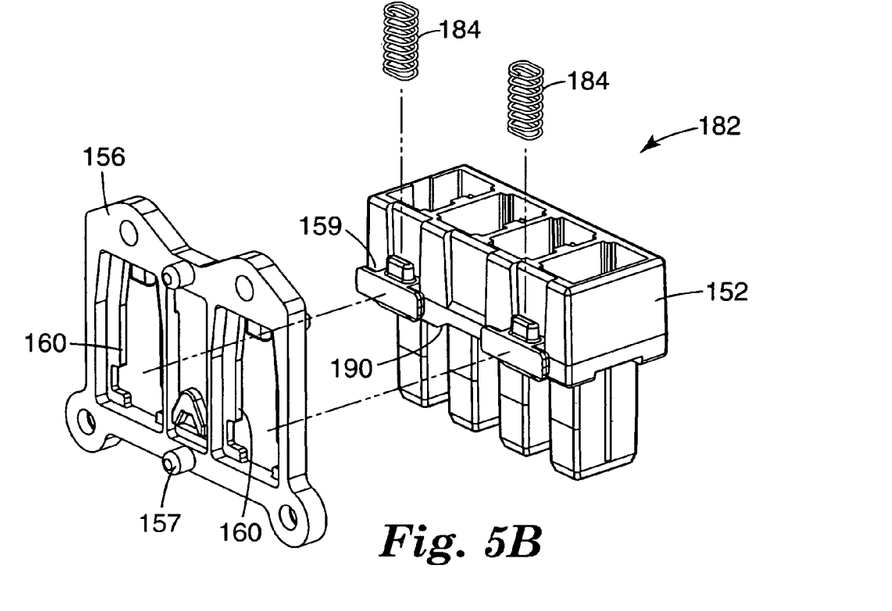

As illustrated in FIG. 5, the longitudinal movement of housing member 152 is controlled by a spring assembly 182. In the illustrated embodiment, the spring assembly 182 includes two springs 184 laterally spaced with respect to each other and located generally at the lateral ends of the housing member 152 and base member 156. Springs 184 are maintained in a slightly compressed state between housing member 152 and base member 156, and are held in position by a mandrel 186 or other suitable retention device. The term spring refers to a resilient or elastic member, such as a coiled spring, a biasing clip, an elastic band, a compression foam, or other similar devices known in the art. The spring assembly 182 serves to exert a forward force along the longitudinal axis on the housing member 152, thus urging housing member 152 to a forward position relative to base member 156. Housing member 152 reaches its extreme forward position when housing member 152 is not engaged with housing 120 (i.e., housing member 152 and housing 120 are in an unmated condition). As an additional benefit, restorative forces are imparted to housing member 152 by springs 184 when lateral and transverse movement of housing member 152 occurs. That is, springs 184 tend to resiliently resist lateral and transverse displacement, thereby aiding in returning housing member 152 to a centered location.

Again referring to FIG. 5, housing member 152 and base member 156 are further provided with interacting alignment means 188 for directing housing member 152 to predetermined lateral and/or transverse positions relative to base 156 as the housing member 152 moves toward its forward position under the biasing force provided by spring assembly 182. In the embodiment illustrated in FIGS. 2–5, the alignment means include a tapered channel or notch 190 on the housing member 152 configured to engage a mating shoulder or protrusion 192 on the base member 156. The tapered notch 190 and shoulder 192 are cooperatively shaped to direct the housing member 152 to a predetermined lateral and/or transverse position as the housing member 152 moves toward its forward position. In the illustrated embodiment, the housing member 152 is centered within its lateral range of motion. As the tapered notch 190 engages shoulder 192, the lateral range of motion gradually and smoothly decreases. Conversely, as housing member 152 moves away from the forward position (as when housing member 152 mates with housing 120), the lateral range of motion increases.

In alternate embodiments according to the invention, the cooperating notches and shoulders defining the alignment means may include notches and/or shoulders of different shapes, or in different positions on housing member 152 and base member 156. The position of the notches and shoulders could be reversed (i.e., notches in base member 156 and shoulders on housing member 152). The alignment means may direct housing member 152 to a position other than a central position in a range of motion (e.g., to an extreme end of a range of motion).

Figure 6:
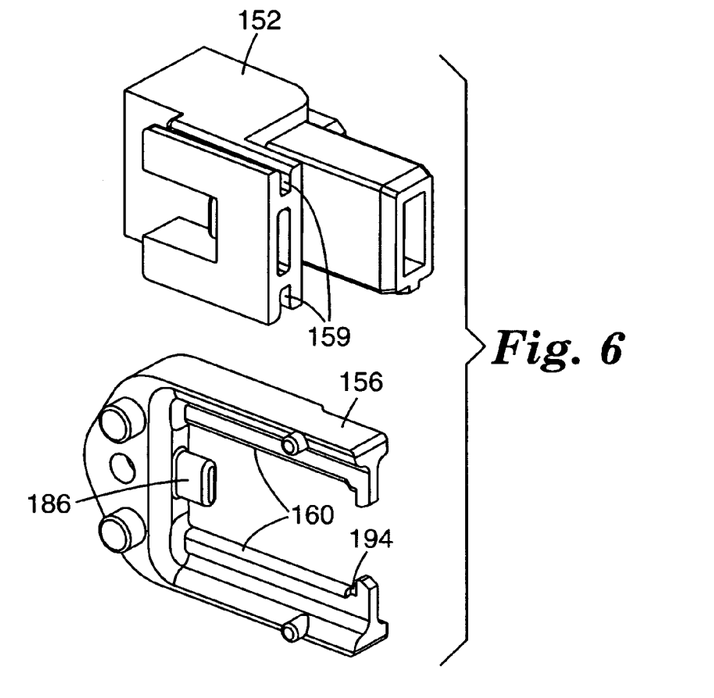
FIG. 6 is an exploded isometric view of another embodiment of an interconnect alignment system according to the invention.
Figure 7:
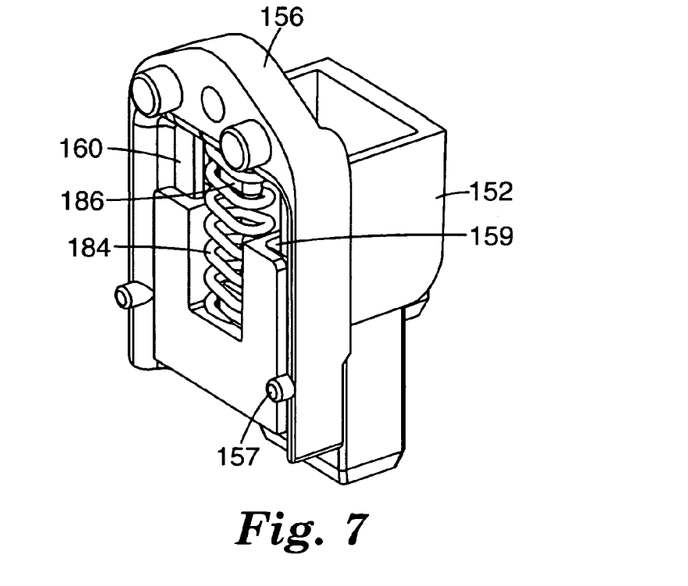
FIG. 7 is an assembled isometric view of the interconnect alignment system of FIG. 6.
Figure 8:
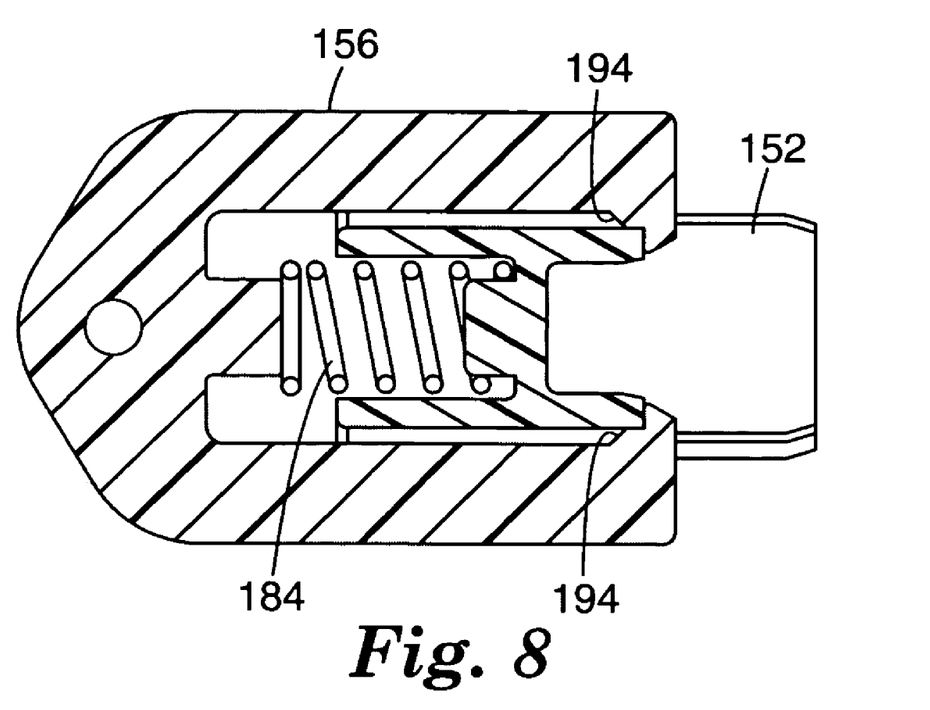
FIG. 8 is a bottom view of the interconnect alignment system of FIG. 7

In another embodiment according to the invention, as illustrated in FIGS. 6–8, the alignment means are integrated into the channels 159 and rails 160 of housing member 152 and base member 156. Specifically, the dimensions and shapes of channels 159 and rails 160 are varied and controlled along the longitudinal axis such that the amount of "float" provided to housing member 152 in the lateral and transverse directions varies in a desired manner as housing member 152 moves in the longitudinal direction. The angular range of motion is generally a function of the lateral and transverse ranges of motion. By controlling the "float" of housing member 152 relative to base 156, the position of housing member 152 can also be controlled. In the embodiment illustrated in FIGS. 6–8, the rails 160 are narrowed (i.e., moved closer together) near the front of base member 156. When housing member 152 is biased by the spring 184 to the forward (unmated) position, housing member 152 becomes centered in the lateral direction as a result of the reduced clearance created by the narrowing of the rails 160. A ramp 194 is provided to ease the transition of housing member 152 to its centered position. The position of housing member 152 in the transverse direction may be similarly controlled by increasing the thickness of rails 160 near the front of base member 156. When housing member 152 engages housing 120, housing member 152 is pushed away from its constrained forward position and the lateral, transverse and angular ranges of motion of housing member 152 increase.

In an alternate embodiment according to the invention, the features of base member 156 are integrated directly into the substrate on which housing member 152 is disposed, and base member 156 is omitted as a separate and distinct component.

In the illustrated examples, base member 156 is rigidly secured to card 102. In other embodiments according to the invention, base member 156 is secured to card 102 such that base member 156 is able to move or float relative to card 102. Base member 156 can be provided, for example, with longitudinal, lateral, transverse, and angular ranges of motion relative to card 102 by providing channel and rail engagement features between base member 156 and card 102, similar to those described between housing 120 and base 156.

In each of the illustrated embodiments, the spring assembly 182 biases the board housing member 152 towards the front or mating edge of the daughter card 102, such that the housing member 152 is forced to move against the resistance of springs 184 when the housing member 152 is moved by an action opposite to that of the normal force of the springs 184, as when housing member 152 mates with housing 120. The combination of the forward bias of the springs 184 and the freedom of movement $x_2$ of the housing member 152 along the longitudinal axis allows compensation for incorrect tolerances in the alignment of the card 102 with respect to the housing 120 on the backplane 104. The combined force of the springs 184 is selected to be greater than the summation of all opposing spring forces, such as those of the independent springs 178 of the individual mating ferrule assemblies. Otherwise, the combined force of the springs 178 of the ferrule assemblies would push the housing assembly backwards thus preventing the desired coupling between the board housing assembly 150 and the backplane housing 120. However, the independent ferrules still retain their range of movement, thus assuring a tight fit on each individual optical cable connection.

Housing member 152 includes one or more hollow protrusions 154 shaped in size to correspond and fit into front openings 134 of a backplane mounted housing 120. The protrusions 154 of housing member 152 in the present embodiment are hollow and rectangular shaped and are terminated in a truncated pyramid shaped lead 162. The pyramid shaped lead 162 allow for compensation of small mating misalignments by directing the protrusions 154 into the receiving cavities 132 of the backplane mounted housing 120. Furthermore, the protrusions 154 are shaped to provide alignment with respect to the inside walls of receiving cavities 132. Protrusions 154 also provide an automatic pressure for opening front doors 138 during mating. The inner walls of protrusion 154 define a stepped cavity 164 that provides guidance to a fiber optic ferrule 170 to be seated inside of the stepped cavity 164. In the illustrated embodiments, the stepped cavity 164 is shaped to receive an industry standard ferrule, such as the MT-Style optical ferrules. Stepped cavity 164 is designed in such a manner that it comprises a front and a rear rectangular opening 166 and 168, respectively. The front opening 166 is sized to allow insertion of the ferrule 170 up to an internal flange 172.

As best seem in FIGS. 2 and 4, a typical MT-style connector includes a ferrule 170 mounted on a stalk of optical fibers 174, slidably connected to a détente body portion 176. The ferrule 170 has a limited range of motion $x_1$ along the longitudinal axis. The stalk of optical fibers 174 is allowed to move with respect to the détente body portion 176. A spring element 178 located between the ferrule 170 and the détente body portion 176 forward biases the ferrule 170 towards a forward end of the range of motion.

In the illustrated embodiments, the housing member 152 of self-aligning connector assembly 150 includes rear openings 166 designed to accept the MT-style connector, including the détente body portion 176. The détente body portion 176 is retained against flange 173 while the ferrule 170 is allowed to extend inside of protrusion 154 up to and through the front opening 168. The détente member 176 is designed in such a manner that as the member 176 is inserted into the front of the stepped cavity 164, the spring 178 is compressed between détente member 176 and the ferrule 170. The ferrule 170 is prevented from traveling freely through the front opening 168 by a flange 180 formed in the ferrule 170. The flange 180 is formed to act as a travel stop for the ferrule 170 when flange 180 is engaged with internal flange 172. The détente member 176 is provided with a latch feature 196 that engages the side walls of rear opening 166 of the assembly 150. Latching features 196 may be provided on both side surfaces of the housing assembly 150 and the détente member 176. It may be desirable in some instances to remove détente member 176 from the housing assembly, and for these situations, a release feature is provided in the side of the housing. This release feature 196 is preferably cantilevered and allowed to pivot and thereby allowing the release feature to be sprung inwards to release the corresponding latch feature 196.

The length of travel of the card 102 along slots 105 in card guides 106 is selected such that when in the coupled or mated position, the card mounted self-aligning connector assembly 150 exerts spring force on the backplane mounted housing 120. In a preferred embodiment, the width of the card gap should be greater than 0, preferably greater than the combined travel of the spring biased ferrules (typically 1 to 2 mm) relative to their respective housings.

The range of motion $x_2$ of the housing member 152 with respect to the card 102 is sufficient to correct for tolerance errors in the range of movement of the card 102 along the card guides 106, and to absorb any excessive force imparted by the user when sliding the card before the card is stopped by the backplane mounted housing 120 or by any stop features that may be present in the card guides 106.

The present invention addresses issues of linear misalignment between components on card 102 and mating components on backplane 104 by self-aligning the housing member 152 in an unmated condition to a predetermined position along its lateral and/or transverse ranges of motion. In one embodiment according to the invention, when in an unmated position, housing member 152 is positioned at the center of its range of lateral and/or transverse movement. Accordingly, in the unmated position, housing member 152 is prevented from being at an extreme location in its range of movement and is therefore prevented from gross misalignment with housing 120, so that interconnection between housing member 152 and housing 120 can be assured. In the mated position, housing member 152 is permitted its full range of lateral, transverse and angular movement so that small ranges of misalignment may be accommodated. In addition, in the mated position the housing member 152 is held tightly against the housing 120 and is subject to a constant spring bias provided by spring assembly 182. The advantage of providing the constant spring bias is to ensure that intimate contact is maintained between the housing member 152 and 120 even in the event that the card 102 is subject to movement during its operation.

Those skilled in the art will appreciate that the present invention may be used when coupling a variety of optical devices and even non-optical devices that require precise alignment. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A fiber optic connector alignment system comprising:
   a base configured for mounting on a first substrate; and
   a housing movably engaged with the base by at least one channel on the housing and at least one rail on the base, the housing configured to secure a terminating ferrule for an optical fiber, a longitudinal orientation of the optical fiber within the terminating ferrule defining a longitudinal axis, the housing movable along the longitudinal axis between a mated position and an unmated position;

wherein the housing has a longitudinal range of motion and a lateral range of motion, with respect to the base, in both the mated and unmated positions, wherein the lateral range of motion when the housing is in the unmated position is less than the lateral range of motion when the housing is in the mated position, and wherein the channel and rail are engaged in both the mated and unmated positions.

2. The fiber optic connector alignment system of claim 1, further comprising a spring element biasing the housing along the longitudinal axis toward the unmated position.

3. The fiber optic connector alignment system of claim 1, further comprising a mating connector disposed on a second substrate and configured to mate with the housing.

4. The fiber optic connector alignment system of claim 1, wherein the housing has an angular range of motion, and wherein the angular range of motion is reduced when the housing is in the unmated position.

5. The fiber optic connector alignment system of claim 1, wherein the housing is configured to secure a plurality of terminating ferrules.

6. The fiber optic connector alignment system of claim 1, wherein the housing has a transverse range of motion, and wherein the transverse range of motion is reduced when the housing is in the unmated position.

7. The fiber optic connector alignment system of claim 1, wherein the lateral range of motion is in the range of 0.030 to 0.050 inches when the housing is in the mated position.

8. The fiber optic connector alignment system of claim 1, wherein the lateral range of motion is less than 0.010 inches when the housing is the unmated position.

9. The fiber optic connector alignment system of claim 1, wherein the rail is shaped to restrict the lateral range of motion of the housing as the housing moves longitudinally toward the unmated position.

10. The fiber optic connector alignment system of claim 9, wherein the rail is shaped to restrict a transverse range of motion of the housing as the housing moves longitudinally toward the unmated position.

11. The fiber optic connector alignment system of claim 9, wherein the housing includes a pair of channels configured to engaged a pair of mating rails on the base member.

12. The fiber optic connector alignment system of claim 1, wherein the housing includes a tapered notch configured to engaged a smaller mating protrusion on the base member, wherein a size difference between the tapered notch and the mating protrusion decreases as the housing moves toward the unmated position.

13. A device for aligning a fiber optic connector on a first substrate with a mating connector on a second substrate, the device comprising:
 a base for securing to the first substrate having at least one rail;
 a housing configured to hold a terminating ferrule and having at least one channel, wherein the housing is slidably engaged with the base by the at least one channel on the housing and the at least one rail on the base member to provide a longitudinal range of motion and a lateral range of motion with respect to the base in both mated and unmated positions; and
 a spring element controlling movement of the housing along the longitudinal range of motion;
 wherein the lateral range of motion varies as the housing is moved through the longitudinal range of motion, and wherein the at least one channel and the at least one rail are engaged in both the mated and unmated positions.

14. The device of claim 13, wherein the spring element urges the housing to a forward position, and wherein the lateral range of motion decreases as the housing approaches the forward position.

15. The device of claim 14, wherein the lateral range of motion gradually decreases as the housing approaches the forward position.

16. The device of claim 13, wherein the longitudinal range of motion comprises a first portion and a second portion, and wherein the lateral range of motion varies in the second portion.

17. The device of claim 16, wherein the housing has an angular range of motion with respect to the base in the first portion of the longitudinal range of motion.

18. The device of claim 13, wherein the housing is configured to hold a plurality of terminating ferrules.

19. The device of claim 13, wherein the base is removably secured to the first substrate.

20. The device of claim 13, wherein the first substrate is substantially parallel to the second substrate.

21. The device of claim 13, wherein the first substrate is substantially orthogonal to the second substrate.

22. A device for self-positioning a terminated conductor on a substrate, the device comprising:
 a housing for holding the terminated conductor, the housing slidably disposed on the substrate by engagement of at least one channel on the housing and at least one protrusion on the substrate such that the housing has a longitudinal range of motion and a lateral range of motion with respect to the substrate in both mated and unmated positions;
 biasing means urging the housing along the longitudinal range of motion toward a forward position;
 wherein the engagement of the channel and protrusion direct the housing to a predetermined lateral position as the housing moves toward the forward position; and
 wherein the channel and protrusion are engaged in both the mated and unmated positions of the housing.

23. The device of claim 22, wherein the predetermined lateral position is substantially centered along the lateral range of motion.

24. The device of claim 22, wherein the lateral range of motion increases as the housing moves away from the forward position.

25. The device of claim 22, wherein the conductor comprises an optical conductor.

26. The device of claim 22, wherein the conductor comprises an electrical conductor.

27. The device of claim 22, further comprising a base member interposed between the housing and the substrate, wherein the base member is slidably engaged with the housing.

28. The device of claim 27, wherein the base member is rigidly mounted on the substrate.

29. The device of claim 27, wherein the base member is movable relative to the substrate.

30. The device of claim 27, wherein the channel and protrusion are cooperatively shaped to direct the housing to the predetermined lateral position as the housing moves toward the forward position.

31. The device of claim 22, wherein the biasing means comprises a spring.

32. The device of claim 22, wherein the channel and protrusion are cooperatively shaped to direct the housing to the predetermined lateral position as the housing moves toward the forward position.

* * * * *